US007014382B2

(12) United States Patent
Satto

(10) Patent No.: US 7,014,382 B2
(45) Date of Patent: Mar. 21, 2006

(54) SELF-CENTERING BALL-AND-SOCKET JOINT METHOD AND APPARATUS

(75) Inventor: Silvio Shiguetoshi Satto, São Bernardo Do Campo (BR)

(73) Assignee: Dana Industrial S/A, State of Sao Paulo (BR)

( * ) Notice: Subject to any disclaimer, the term of this patent is extended or adjusted under 35 U.S.C. 154(b) by 241 days.

(21) Appl. No.: 10/600,565

(22) Filed: Jun. 23, 2003

(65) Prior Publication Data

US 2004/0042847 A1 Mar. 4, 2004

(30) Foreign Application Priority Data

Sep. 3, 2002 (BR) ............................................ 0203693

(51) Int. Cl.
*F16D 11/00* (2006.01)

(52) U.S. Cl. ...................................................... 403/126

(58) Field of Classification Search ................ 403/122, 403/124–126, 137
See application file for complete search history.

(56) References Cited

U.S. PATENT DOCUMENTS

| | | | | | |
|---|---|---|---|---|---|
| 3,430,995 | A | * | 3/1969 | Herbenar et al. | 403/126 X |
| 3,613,201 | A | * | 10/1971 | Herbenar | 403/126 X |
| 3,790,195 | A | * | 2/1974 | Herbenar | 403/124 |
| 5,649,779 | A | * | 7/1997 | Martin et al. | 403/122 X |

* cited by examiner

*Primary Examiner*—John R. Cottingham
(74) *Attorney, Agent, or Firm*—Liniak, Berenato & White

(57) ABSTRACT

A self-centering ball and socket joint for connecting parts requiring restricted angular movement in a pre-established direction, and free rotary movement in a corresponding direction. The joint is comprised of a spherical pin (01) with an encased end, and an opposite exposed end. The encased end of the spherical pin (01) is comprised of first (09) and second (10) hemispheres, disposed within a bearing assembly (02, 03). The first hemisphere has a relatively larger diameter (09), than the second hemisphere (10). The hemispheres (09, 10) interact with the bearing assembly (02, 03) to continuously urge the spherical pin (01) to return to a pre-determined position. Although the invention has broad potential applicability, its primary uses are in motor vehicle tie rod steering and suspension systems.

17 Claims, 1 Drawing Sheet

SELF-CENTERING BALL-AND-SOCKET JOINT METHOD AND APPARATUS

CROSS REFERENCE TO RELATED APPLICATIONS

This application claims priority to, and incorporates by reference, Brazilian Patent Application No. PI0203693-2 filed by Dana Industrial Ltd., an affiliate of Dana Corporation, on Sep. 3, 2002.

BACKGROUND OF THE INVENTION

1. Field of the Invention

The invention generally relates to ball and socket joints. The invention is specifically applicable tie rod ends in automotive steering and suspension systems.

2. Description of the Background Art

A typical prior art ball-and-socket joint comprises a case or housing in combination with a single ball integrated into one end of a main body, commonly known as spherical pin. This ball-and-socket joint assembly, correctly mounted, has a first fastening system on the external case, and a second fastening system at the opposite exposed end of the spherical pin assembly. Once the external case is attached to a movable part, and the spherical pin exposed end is attached to a separate part, the joint provides angular rotary movement between the respective parts. These types of joints are commonly used on vehicle steering and suspension systems. Depending on the specific application, the case and spherical pin may have different operational characteristics required to facilitate the specific function of the joint.

In operation, the ball-and-socket joint allows the swiveling movement of the spherical pin, but at the same time, restricts the angular movement of this spherical pin in certain directions, so that the force generated between the external case attachment point and the exposed end attachment point is communicated along the longitudinal axis of the spherical pin, as required in a functional tie rod or steering rod system.

In prior art systems, extreme angies between the spherical pin and the case, and rotational problems with the spherical pin have resulted in premature wear and failure. To address this problem, various solutions have been proposed, including alternative configurations of the case opening, and the replacement of the protective sealing cover of the ball-and-socket joint with a type of rubber bushing that, when compressed, imparts a spring effect to the assembly. However, neither of these techniques, either alone or in combination has resolved the wear problem. Additionally, the replacement protective cover incorporating the rubber bushing requires additional machining, increases production costs, and provides inferior protection relative to the original ball joint cover. If the ball joint cover fails, impurities such as dust, sand, and water can contaminate the joint and rapidly degrade its function until failure occurs. Further, the effective use of the prior art systems is limited to applications with little relative movement, and low stress on the spherical pin.

In order to eliminate these deficiencies, the present self-centering ball-and-socket joint has been developed. The present invention may be used in any system, but is designed primarily for those requiring angular movement restrictions of the spherical pin in certain directions, while retaining a free rotary movement capability. More specifically, the joint was designed for automotive tie rod applications. In operation, the invention functions to ensure that the tie rod will always be aligned with the other components of the system, and the self-centering function of the spherical pin operates to ensure that component forces are aligned with the spherical pin's longitudinal axis.

SUMMARY OF THE INVENTION

The invention comprises a self-centering ball-and-socket joint used in connecting parts requiring restricted angular movement in a pre-established direction, and free rotary movement in corresponding directions. The joint is comprised of a spherical pin with an encased end, and an opposite exposed end having a connecting system. The encased end is comprised of two hemispheres, one with a relatively larger diameter, and one with a smaller diameter. The hemispheres are joined, and immediately encased by upper and lower bearings, with an external casing enclosing the entire assembly. The lower bearing applies a spring-type force equal and opposite to angular forces applied to the spherical pin. The interaction between the lower hemispherical end of the spherical pin, and the elastic lower bearing, exerts a continuous force on the spherical pin to return to the spherical pin's previous geometric axis.

The present invention is a relatively simple self-centering ball and socket-type joint, with superior movement and wear characteristics. The ball and socket type joint is primarily designed for motor vehicle applications, specifically, in automotive steering and suspension systems.

DETAILED DESCRIPTION OF THE INVENTION

Figure 1:
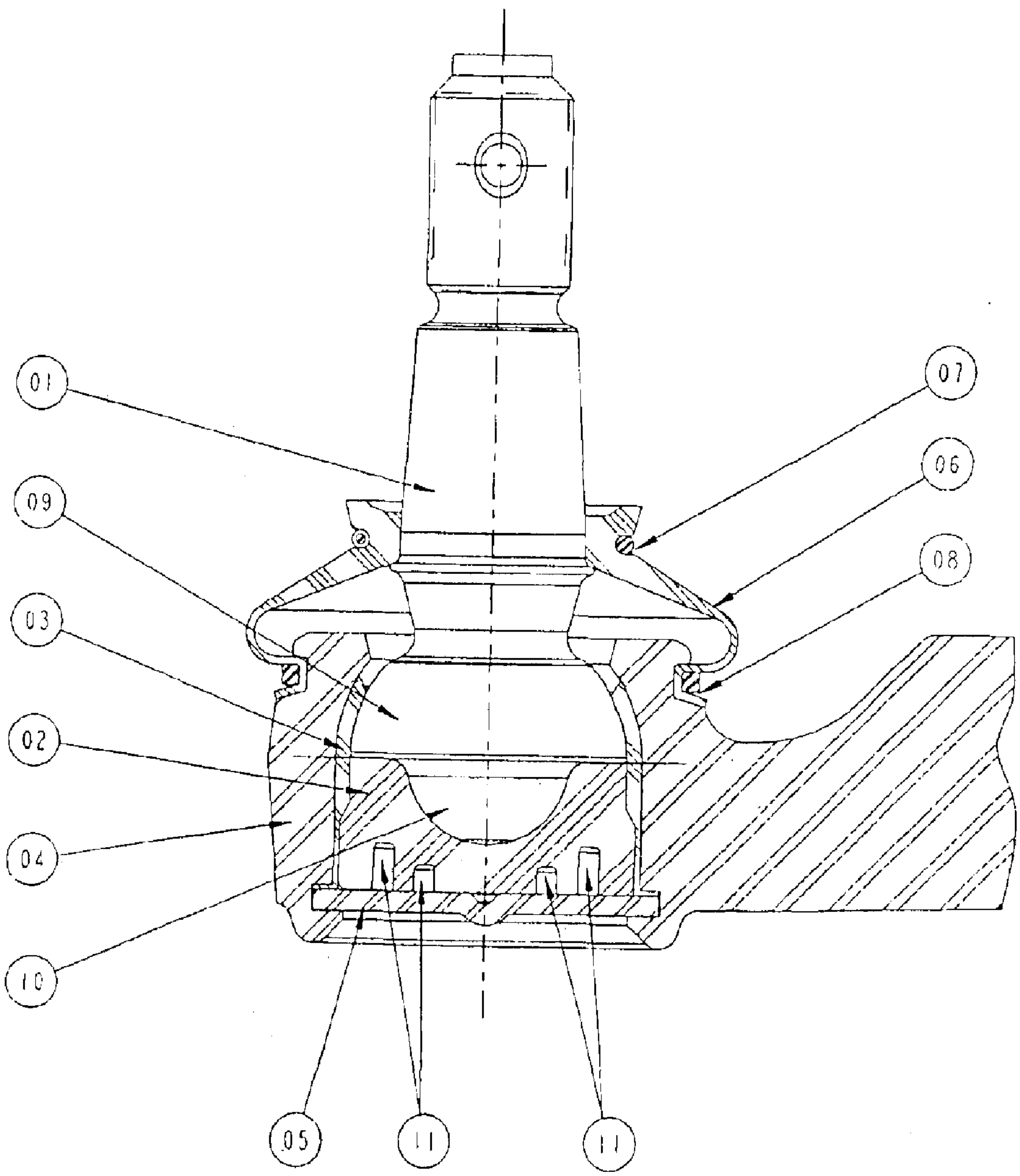
FIG. 1 is a partial sectional view of the present invention, exposing the spherical pin of the ball-and-socket joint.

An embodiment of the present invention will now be described with reference to the accompanying drawing. It should be noted that the terms "front", "rear", "left", "right", "upper", and "lower", relate to directions as viewed in FIG. 1, but may not be applicable to the invention when installed in a specific application.

As seen in FIG. 1, the ball-and-socket joint is comprised of a spherical pin 1, with an encased end, and an opposite exposed end designed for connection to a moveable support component (not shown). The encased end of the spherical pin 1 is enclosed in an upper bearing 3, and a lower bearing 2. The bearing assembly is mounted inside a case 4, with the lower bearing 2 closed and held in place by a lower sealing cover 5. The non-enclosed (exposed) end of the spherical pin 1 extends out of the case 4, so that the exposed end of the spherical pin 1 may be fixed to a moveable support component, the joint thereby restricting the component's angular and free rotary movement.

A sealing cap 6 is attached to the spherical pin 1 at the point where the pin 1 emerges from the external case 4. At its upper end, the sealing cap 6 is fastened to the spherical pin 1 by an upper sealing ring 7. At its lower end, the sealing cap 6 is attached to the upper end of the external case 4 by a lower ring 8.

At the enclosed end of the spherical pin 1, two hemispheres, or half-ball segments 9, 10, are positioned, and joined to form a single part. The hemispheres 9, 10, and spherical pin 1 may be created from a single piece of material to increase the strength of the assembly, or the hemispheres 9, 10, and spherical pin 1 they may be created by joining component parts. The upper hemisphere 9 has a greater diameter than the lower hemisphere 10. The upper hemisphere is coupled to the upper bearing 3, and the lower hemisphere is coupled to the lower bearing 2. The lower bearing 2 is comprised of material having elastic characteristics and properties such that, it not only supports the axial load of the spherical pin, but also, through contact with the smaller diameter hemisphere 10, applies a counteracting force in an equal and opposite direction to lateral forces applied to the spherical pin 1. The net effect of the upper and lower hemispheres 9, 10, and upper and lower bearings 2, 3, on the spherical pin 1, is to create a unique spring effect, that continually urges the spherical pin 1, back toward its previous geometric center. Holes 11 in the base of the lower bearing 2 adjacent to the lower sealing cover 5 also effectively assist the lower bearing 2 in counteracting the lateral forces applied to the spherical pin 1.

The invention, as described, may be modified in multiple ways and applied in various technological applications. For example, in addition to automotive applications, the ball-and-socket joint may be used in nautical and aeronautical applications as well. Similarly, although the materials of construction are generally described, they may also include a variety of compositions consistent with the function of the invention. Such variations are not to be regarded as a departure from the spirit and scope of the invention, and all such modifications as would be obvious to one skilled in the art are intended to be included within the scope of the following claims.

I claim:

1. A self-centering ball-and-socket joint, comprising:

(a) a spherical pin (01), with a first end coupled to first (03) and second (02) bearings, (b) said first end comprised of first (09) and second (10) hemispheres, said first hemisphere (09) having a larger diameter than said second hemisphere (10), (c) said first (03) and second (02) bearings being mounted inside a case (04), said case (04) having a connection system, (d) said spherical pin (01), having a second end extending out of said case (04), said second end having a connection system.

2. The joint of claim 1, wherein said first end of said spherical pin (01) interacts with said bearing assembly (02, 03) to restrict motion in a first pre-determined direction, and to allow free rotary motion in a second pre-determined direction.

3. The joint of claim 1, wherein said first hemisphere (09) is coupled with said first bearing (03), said first bearing (03) having an arcuate shape, and said second hemisphere (10) being coupled with said second bearing (02).

4. The joint of claim 1, wherein restricted angular movement of said second end of said shear pin (01) occurs as a result of the said second bearing (02) interaction with said second hemisphere (10), said second bearing (02) being comprised of an elastic material.

5. The joint of claim 1, wherein the said second bearing (02) includes holes (11), adjacent to a lower sealing cover (05).

6. The joint of claim 5, wherein said holes (11) decrease in depth from said second bearing's (02) outer circumference, to said second bearing's (11) centerline.

7. The joint of claim 5, wherein said lower bearing (02) creates a spring effect that urges said spherical pin (01) back to a predetermined position.

8. The joint of claim 1, wherein said first hemisphere (09), and said second hemisphere (10) form a single unitary part, created from a single piece of material.

9. A self-centering ball-and-socket joint used in connecting parts requiring restricted angular movement, said joint comprising:

(a) a spherical pin (01) with a first end disposed within a bearing assembly (02, 03) said bearing assembly (02, 03) being disposed within a case (04); and (b) said bearing assembly (02, 03) comprising first (03) and second (02) bearings; and (c) said first (03) and said second (02) bearings being comprised of elastomeric material;

(d) said first end of said spherical pin (01) further comprising first hemisphere (09) and second body portion (10) integrally formed as a unitary member, said first hemisphere (09) having a larger diameter than said second body portion (10); and (e) said first hemisphere (09) and second body portion (10) respectively disposed within said first (03) and second (02) bearings; and (f) said first hemisphere (09) directly contacting said elastomeric first bearing (03), and said second body portion (10) directly contacting said elastomeric second bearing (02); and (g) said second (02) bearings contacting a flat portion of said first hemisphere (09), and said second bearing contacting an arcuate portion of said second body portion (10) such that said spherical pin (01) is continuously urged to return to a pre-determined position;

(h) a sealing cover (05) directly contacting said second bearing (02), said sealing cover (05) sealing said outer case (04).

10. The joint of claim 9, wherein said second bearing (02) includes a plurality of elongated holes generally extending parallel to an axis defined by a pin portion of said spherical pin (01) to assist the second bearing (02) in counteracting lateral forces applied to the spherical pin (01).

11. The joint of claim 10, wherein said second body portion (10) defines a semi-spherical body, a majority of said second body portion (10) having an external curved surface of constant radius.

12. The joint of claim 10, wherein said first bearing (03) partially overlaps said second bearing (02).

13. The joint of claim 10, wherein said second bearing (02) defines a substantially cup-shaped member conforming to a shape defined by said first hemisphere (09) and said second body portion (10) said first hemisphere (09) and said second body portion (10) coming to rest against said cup-shaped member.

14. The joint of claim 1, wherein said second hemisphere (10) defines a semi-spherical body, a majority of said second hemisphere (10) having an external curved surface of constant radius.

15. The joint of claim 1, wherein said first bearing (03) partially overlaps said second bearing (02).

16. The joint of claim 1, wherein said second bearing (02) includes a plurality of elongated holes generally extending parallel to an axis defined by a pin portion of said spherical pin (01) to assist the second bearing (02) in counteracting lateral forces applied to the spherical pin (01).

17. The joint of claim 10, wherein said second bearing (02) defines a substantially cup-shaped member conforming to a shape defined by said first and second hemispheres (09, 10), said first and second hemispheres (09, 10) coming to rest against said cup-shaped member.

* * * * *